US009639350B2

(12) United States Patent
Best (10) Patent No.: US 9,639,350 B2
(45) Date of Patent: May 2, 2017

(54) TAGGING NON-UPSTREAM SOURCE CODE

(71) Applicant: Red Hat, Inc., Raleigh, NC (US)

(72) Inventor: Steven Best, Groton, MA (US)

(73) Assignee: Red Hat, Inc., Raleigh, NC (US)

( * ) Notice: Subject to any disclaimer, the term of this patent is extended or adjusted under 35 U.S.C. 154(b) by 13 days.

(21) Appl. No.: 14/569,878

(22) Filed: Dec. 15, 2014

(65) Prior Publication Data

US 2016/0170745 A1  Jun. 16, 2016

(51) Int. Cl.
*G06F 9/44* (2006.01)

(52) U.S. Cl.
CPC . *G06F 8/71* (2013.01); *G06F 8/68* (2013.01)

(58) Field of Classification Search
CPC .......... G06F 8/30; G06F 8/71; G06F 9/44521
USPC ........................................ 717/122
See application file for complete search history.

(56) References Cited

U.S. PATENT DOCUMENTS

| 6,681,382 B1* | 1/2004 | Kakumani | G06F 8/71 |
| | | | 707/999.103 |
| 7,941,798 B2* | 5/2011 | Taylor | G06F 8/71 |
| | | | 717/170 |
| 8,255,363 B2* | 8/2012 | Johnson | G06F 8/61 |
| | | | 707/624 |
| 2008/0155493 A1* | 6/2008 | Zernik | G06F 9/465 |
| | | | 717/100 |
| 2013/0074038 A1* | 3/2013 | Fox | G06F 8/70 |
| | | | 717/122 |
| 2013/0311972 A1* | 11/2013 | Supplisson | G06F 11/362 |
| | | | 717/121 |
| 2014/0157232 A1 | 6/2014 | Li | |

OTHER PUBLICATIONS

Chacon-Pro Git Book—Nov. 2014, Author—Chacon et al., Book Title: Pro Git, 2014.*
Git status—man page, Git Documentation, located at http://got-scm.com/docs/git-status, Captured on Mar. 2014.*
Alder—Git Tagging uncommiited files—Aug. 2014, Author: Daniel Alder, Title: "Bash script for tagging", located at: http://codereview.stackexchange.com/questions/68674/bash-script-for-tagging-the-current-git-workspace-including-uncommitted-changes , Nov. 2014.*

(Continued)

*Primary Examiner* — Ted T Vo
*Assistant Examiner* — Hossain Morshed
(74) *Attorney, Agent, or Firm* — Lowenstein Sandler LLP (57) ABSTRACT

A method relates to identifying, by a processing device, a plurality of source code objects associated with an open source product stored in a version-controlled code repository, determining a first subset of the plurality of source code objects associated with a respective commit identifier indicating that each of the first subset of the plurality of source code objects is committed to the version-controlled code repository, determining a second subset of the plurality of source code objects not associated with any commit identifier of the version-controlled code repository, labeling each of the first subset of the plurality of source code objects as an upstream source code object, and labeling each of the second subset of the plurality of source code objects as a non-upstream source code object.

20 Claims, 4 Drawing Sheets

(56) References Cited

OTHER PUBLICATIONS

TortoiseGit—Moving Files and Folders Oct. 2014, Author: TortoiseGit, Title: Copying/Moving/Renaming files and folders, located at : https://tortoisegit.org/docs/tortoisegit/tgit-dug-copy.html, captured Jun. 2014.*

Loeliger-OReilly Version Control with GIT-2009, Author: Jon Loeliger, Book Title: Version Control with Git, Published on May 2009.*

Chacon-Pro Git, second Edition release date Nov. 2014, Author: Chacon, Title: Pro Git, Second Edition, shows the release date of the book, Nov. 2014.*

NPL—Meyer-Gleaves—Moving files between projects in TFS-2009 located at http://alexmg.com/moving-files-between-projects-in-tfs/.*

Jenkins, "Subersion Tagging Plugin", Jenkins Wiki, Jul. 14, 2014, pp. 1-6 https://wiki.jenkins-ci.org/display/JENKINS/Subversion+Tagging+Plugin.

Loeliger, Jon, "Version Control with Git", O'Reilly Media, Inc., Sebastol, CA, May 2009, 319 pages http://www.foo.be/cours/dess-20122013/b/OReilly Version Control with GIT.pdf.

"Tasks", EGit User Guide, eclipse.org, 95 pages http://help.eclipse.org/luna/index.jsp?topic=%2Forg.eclipse.egit.doc%2Fhelp%2FEGit%2FUser_Guide%2FTasks.htm (last accessed Mar. 11, 2015).

"Git-Rebase", git-scm.com, 19 pages http://git-scm.com/docs/git-rebase (last accessed Mar. 11, 2015).

Knittl-Frank, Daniel, "Analysis and Comparison of Distributed Version Control Systems", Fachhochschul-Bachelorstudiengang Software Engineering, Hagenberg, Austria, Jun. 2010, 55 pages http://phihag.de/2012/mt/sources/version-management/ba2.pdf.

\* cited by examiner

TAGGING NON-UPSTREAM SOURCE CODE

TECHNICAL FIELD

This disclosure relates to code control and, in particular, to identifying and tagging code that is not upstream.

BACKGROUND

Open source commercial offerings (or products) often include source code of software modules that are submitted by different contributors. Source code is referred to as "upstream" if the owner (likely the original author) or maintainer of a software module accepts patches (or modifications) to the source code sent to the owner by other entities (e.g., a reviewer of the software module). A patch may correct certain perceived defects in the software module. The owner may or may not accept the submitted patch. If accepted, the owner includes the upstream patch in a database (e.g., an upstream GIT tree) that the owner uses to store the software module and assume the responsibility to maintain the patch. However, if rejected, the patch is non-upstream, and the developer of the patch is responsible for maintaining and distributing the patch.

Owners of software modules refuse patches from other entities for various reasons. For example, the open source product may use a different approach to turn on kernel configuration options than the owner of the software module allows. In another example, the owner of the software module does not allow a policy in the kernel area. An inadmissible policy is "crashkernel=auto" which is a policy that may automatically reserve the memory that is used for crash dump. The owner could consider that this policy for the software module is inadmissible.

In a major open source commercial offering release, the kernel itself may include hundreds of patches that are not upstream, and the whole product may include quite a bit more of code patches that are not upstream.

BRIEF DESCRIPTION OF THE DRAWINGS

The present disclosure is illustrated by way of example, and not by way of limitation, in the figures of the accompanying drawings.

DETAILED DESCRIPTION

Patches to software modules of open source products are typically not tagged with identifiers to identify whether a patch is upstream or non-upstream. A patch to a software module of an open source product is upstream if the owner of the software module accepts the patch as an update to the software module. If the owner of the software module refuses the patch, the patch is non-upstream. Since the owner of a software module that accepts upstream patches is responsible for maintaining the software module and upstream patches associated with the software module, and the entity that releases the open source product is responsible for non-upstream patches, some of the un-tagged, non-upstream patches often get lost when the open source product is moved from the storage location of a current release (or version) to a storage location of a next release (or next version). Therefore, there is a need to identify and tag non-upstream patches in a code repository for an open source product so that all the non-upstream patches can be relocated from the storage of an earlier version to the storage of a newer version.

One way to solve this problem is to open a designated and tracked storage area (such as a Bugzilla) for the next release and manually identify and move the non-upstream patches from the current release to the designated storage area. However, the manual approach is prone to errors since there are numerous patches in an open source release.

Implementations of the present disclosure include a method relating to identifying, by a processing device, a plurality of source code objects associated with an open source product stored in a version-controlled code repository, determining a first subset of the plurality of source code objects associated with a respective commit identifier indicating that each of the first subset of the plurality of source code objects is committed to the version-controlled code repository, determining a second subset of the plurality of source code objects not associated with any commit identifier of the version-controlled code repository, labeling each of the first subset of the plurality of source code objects as an upstream source code object, and labeling each of the second subset of the plurality of source code objects as a non-upstream source code object.

Implementations of the present disclosure include a system including a memory and a processing device, operatively coupled to the memory, the processing device to identify a plurality of source code objects associated with an open source product stored in a version-controlled code repository, determine a first subset of the plurality of source code objects associated with a respective commit identifier indicating that each of the first subset of the plurality of source code objects is committed to the version-controlled code repository, determine a second subset of the plurality of source code objects not associated with any commit identifier of the version-controlled code repository, label each of the first subset of the plurality of source code objects as an upstream source code object, and label each of the second subset of the plurality of source code objects as a non-upstream source code object.

Implementations of the present disclosure may include systems and methods to identify and tag non-upstream software code or patches stored in an open source code repository with a unique identifier. In response to tagging the non-upstream software code or patches with the unique identifier, the tagged non-upstream software code or patches may be identified and grouped together according the tags, and moved from the current release to the storage location of a next release. In this way, non-stream software code or patches may be reliably migrated between releases.

Figure 1:
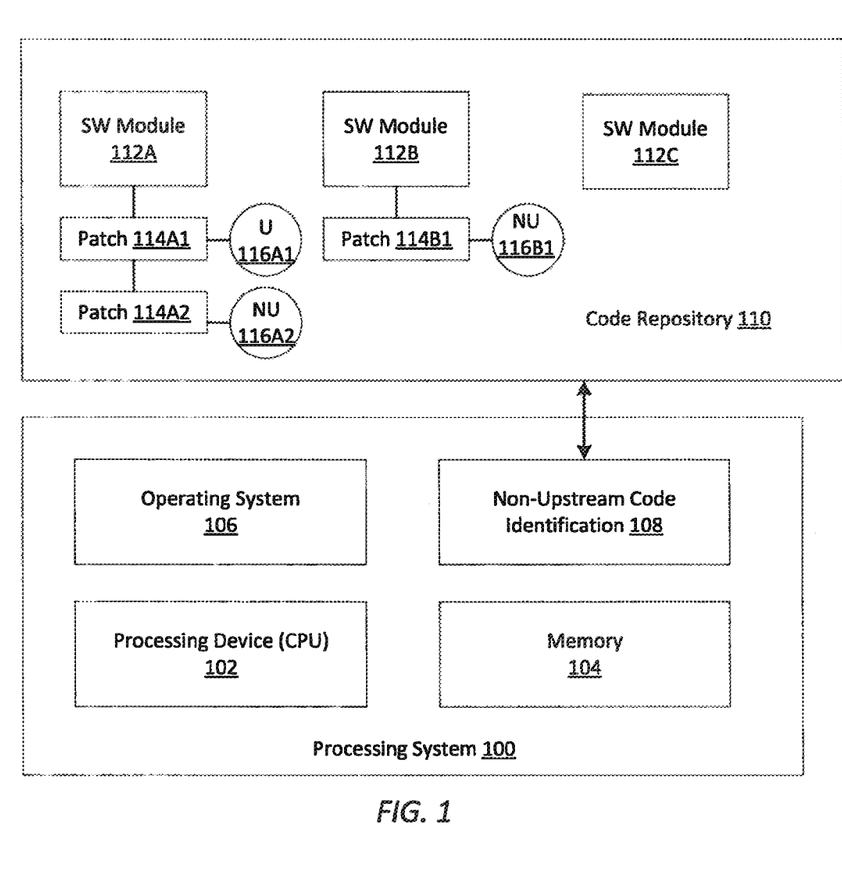
FIG. 1 illustrates a processing system to label non-upstream software code objects according to some implementations of the present disclosure.

FIG. 1 illustrates a processing system 100 to identify and tag non-upstream patches according to some implementations of the present disclosure. Referring to FIG. 1, the processing system 100 may include a processing device 102 (such as a central processing unit (CPU) with one or more processing cores) and a memory device 104 operatively coupled to the processing device 102. The processing system 100 may be any type of computing devices including, but not limited to, a server computer. The memory device 104 may store executable instructions of software applications and the data associated with execution of the software applications. The processing device 102 coupled to the memory 104 may execute the instructions of the software applications.

In one implementation, the processing system 100 may include other resources (not shown) such as network cards to transmit and/or receive data with a network and storage devices that are mountable to the processing system 100. An operating system 106 may serve as a software layer to the software applications with an abstract computer model to handle and manage all the resources of the processing system 100.

In one implementation, the processing system 100 is coupled to a code repository 110 which may be a networked repository that is accessible by different open source developers. Open source developers may develop software modules of an open source product, and submit by uploading these modules to the code repository 110. For example, an open source operating system (such as releases of Red Hat Enterprise Linux) includes a kernel that includes hundreds of modules such as kernel-based virtual machine (KVM) and the file system. Referring to FIG. 1, code repository 110 may include a data store as a centralized or distributed code depot to receive and store software modules uploaded by open source developers. For example, open source developers may upload software modules 112A-112C to the code repository 110. These software modules 112A-112C constitute part of an open source software product. An organization (such as a corporation or a non-profit association) is responsible for collecting and integrating various software modules into the open source product and releases a tested version of the open source product as a current version of the open source product.

In the process of open source product development, the software modules 112A-112C submitted by developers are reviewed and tested by other programmers either from a third party or from the organization that is responsible to release the product. During the review and testing process, these programmers may develop patches to software modules for the purpose of enhancing certain features or fixing perceived bugs in the software modules. These patches, when applied to the associated software modules, may cause the insertion and/or deletion one or more lines of code in the associated software modules. For example, referring to FIG. 1, an open source programmer may have developed a first patch 114A1 to enhance certain functionality in the software module 112A, and later, another open source developer (or the same open source developer) may develop a second patch 114A2 improving on the first patch 114A1. Each of patches 114A1, 114A2 may insert or delete one or more lines of code in the software module 112A. Similarly, patch 114B1 may modify the code of software module 112B. These patches 114A1, 114A2, 114B1 are stored in code depository 110 along with software modules 112A, 112B, 112C.

For the reasons discussed above, some of the patches are upstream, i.e., the owner of the software module accepts the upstream patch as an update to the software module. Further, the owner of the software modules assumes the responsibility of incorporating these patches into the software modules and maintaining the modified software modules through different versions of the open source product. However, some of the patches are non-upstream, i.e., the owner of the software modules does not accept the non-upstream patches. As such, the responsibility of integrating and maintaining non-upstream patches are with the organization that is to package and release the open source product.

In one implementation, processing system 100 includes a non-upstream code identification application 108 executed on processing device 102. Non-upstream code identification application 108 may identify and tag patches that are non-upstream based on how the patches are stored in a version-controlled code repository. For example, non-upstream code identification application 108 may identify patches 114A2 and 114B1 as non-upstream and label them as such. Thus, when the code in the code repository 110 needs to move to a new code depository for a next version, the administrator of the code depository 110 may identify all the non-upstream patches according to their tags and move these tagged patches to the new code depository without errors.

In one implementation, each patch represents a modified version of the corresponding software module. When the patch is accepted and approved by the upstream developer of the corresponding software module, the accepted patch may be committed into a version-controlled code repository. The commitment of the patch into the version-controlled code repository places the patch as a node of a hierarchical data structure (e.g., a tree-type data structure) that keeps a record of the history of different versions of the software module. Different versions of the software module correspond to different patches of the software module. Additionally, the commitment also attaches a unique commit identifier ("commit ID") to the patch so that the patch may be retrieved from the version-controlled code repository using the commit identifier.

Figure 2:
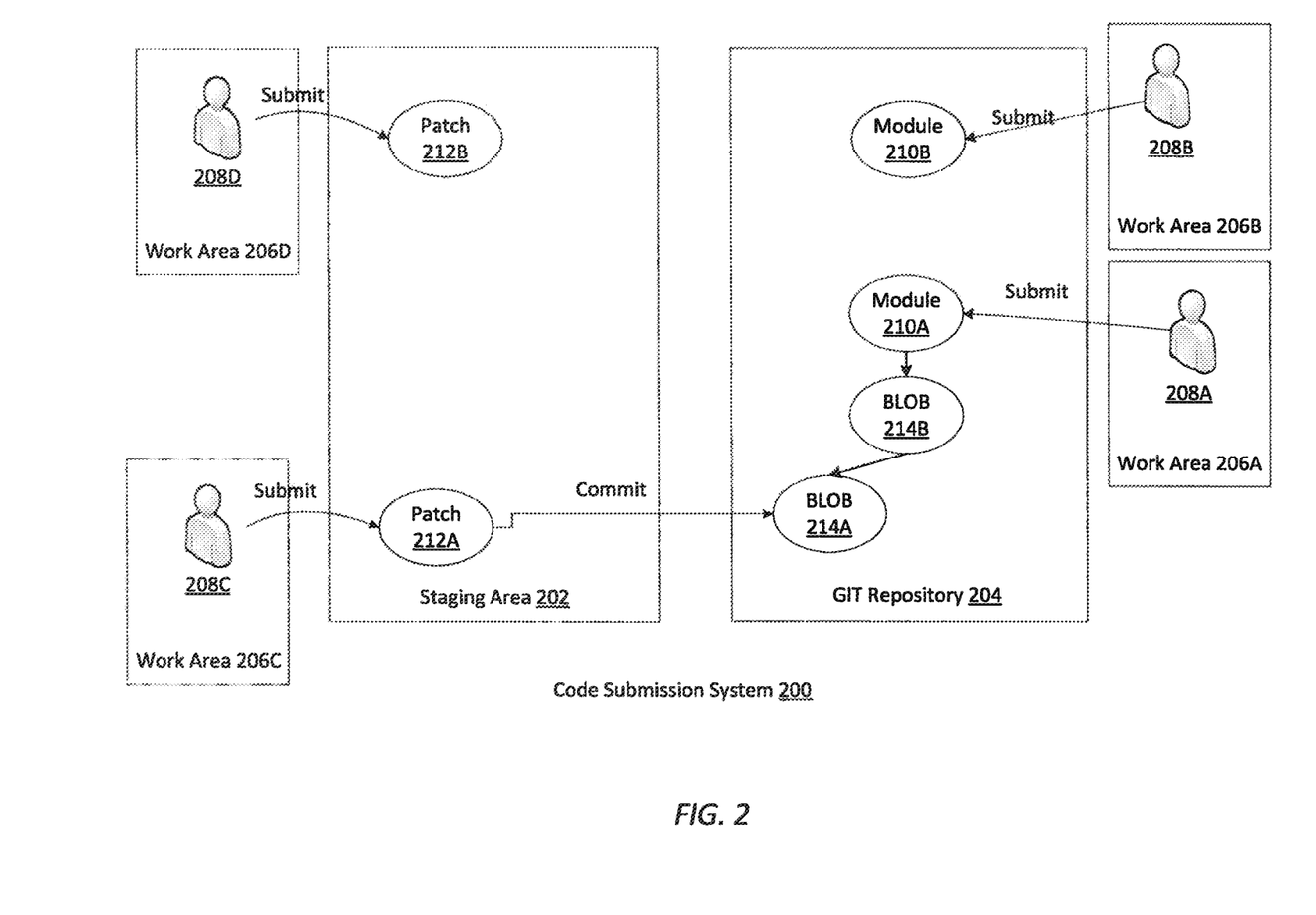
FIG. 2 illustrates a code submission system to commit code into a version-controlled code repository according to an implementation of the present disclosure.

FIG. 2 illustrates a code submission system 200 to commit code into a version-controlled code repository 204 according to an implementation of the present disclosure. Referring to FIG. 2, to develop an open source product (such as a version of a Linux OS), an administrator may create a code submission system 200 for developers to upload code from their working directory to the system. In one implementation, the code submission system 200 is a GIT type system that may include a staging area 202 and a GIT repository 204. GIT is a distributed version control system developed by Junio Hamano and Linus Torvalds.

In one implementation, a first set of developers 208A-208B may develop software modules 210A-210B, and a second set of developers 208C-208D may develop patches 212A-212B to these software modules 210A-210B. Developers 208A-208B may develop the code in their respective working areas 206A-206D and then submit the developed code of software modules 210A-210B, 212A-212B to code submission system 200. In one implementation, the code of software module 210A-210B are stored in a version-controlled GIT repository 204. Each software module and the patches associated with the software module may be stored in a tree-type data structure with the software module (e.g., 210A-210B) at the top of the tree and patches as nodes (or children) of the tree. When the tree is committed and stored in the GIT repository 204, it is identified by a tree identifier ("tree object ID"). In one implementation, the tree object ID is a SHA-1 checksum of certain length (e.g., 40 byte long). The tree object ID may be used to retrieve a snapshot of the tree including all nodes and sub-trees of the tree.

In one implementation, developers 208C-208D develop patches 212A-212B in their respective work areas 206C-206D for the software modules 210A-210B. Patches are developed to enhance the functionality or fix bugs of the software modules 210A-210B. Developers 208C-208D may write and test the code of patches 212A-212B in their respective work area 206C-206D and then submit the code of patches 212A-212B to the stage area 202 of code submission system 200. The code of patches 212A-212B may be reviewed and further tested in the stage area 202 by other developers and the entity that is responsible for releasing the open source product. In one implementation, the stage area 202 may include a mailing list of a group of expert developers who may vote to confirm and approve the code of patches 212A-212B.

Upon the approval by the committee, the administrator of the code submission system 200 may contact the developer of a software module that the patch modifies for a permission to add or commit the patch as a node to the tree of the software module stored in the GIT repository 204. For example, referring to FIG. 2, developer 208D may submit patch 212B to stage area 202. After approval by reviewers, the administrator of code submission system 200 may contact developer 208B who is the upstream developer of software module 210B for permission to commit patch 212B to GIT repository 204 as a modified version of software module 210B. For reasons, developer 208B may refuse to accept patch 212B even though patch 212B may be part of the open source product encompassing the software module 210B.

Developer 208C may submit patch 212A to staging area 202. After approval by reviewers, the administrator of code submission system 200 may contact developer 208A who is the upstream developer of software module 210A and receive the permission to commit patch 212A to GIT repository 204 as the latest modified version of software module 210A. After commitment, patch 212A is stored as a commit object 214A.

In one implementation, commit object 214A may be a binary large object ("blob") file that includes a commit identifier ("commit ID"), an optional parent blob commit ID, a tree ID, name of the author of the blob (or patch), name of the committer, and a commit message. The commit ID is a SHA-1 hash code of the content (i.e., code of patch 212A) that is used to uniquely identify the commit object 214A. In some implementations, the blob 212A may be based on another already-committed patch (e.g., in blob 214B). Thus, commit object 214A is a child node to the node of commit object 214B. The blob 214A may include the commit ID of its parent blob 214B. The commit ID of blob 214B may be used to reverse the changes made by patch 212A. Blob 214A may also include the tree ID that the commit object 214A is associated with.

Implementations of the present disclosure may take advantage of the software commitment process to identify non-upstream patches. In one implementation, the processing device may execute the non-upstream code identification application 108 to identify a first set of patches that have an associated commit ID and a second set of patches that do not have an associated commit ID. Patches having an associated commit ID are tagged with an upstream tag as upstream patches, and patches having no associated commit ID are tagged with a non-upstream tag as non-upstream patches.

In one implementation, non-upstream code identification module 108 may execute certain GIT command (such as git blame) to extract a commit id field of a blob and determine if the commit id field include a commit id or not. Non-upstream code identification module 108 may further tag each patch that has a commit id with an upstream tag and each patch that does not have a commit id with a non-upstream tag.

In one alternative implementation, instead of using the commit id to identify upstream and non-upstream patches, the non-upstream code identification module 108 may identify non-upstream patches based on code difference between a patch that modifies a software module and patches stored in a GIT tree maintained by the owner of the software module. The owner of the software module stores patches to the software module in an upstream GIT tree that is accessible by non-upstream code identification module 108. To determine whether a patch to the software module is upstream or not, non-upstream code identification module 108 may calculate code difference between the patch with patches stored in the upstream GIT tree (e.g., using the diff command). If the patch has no different code with any patch stored in the upstream GIT tree, non-upstream code identification module 108 may tag the patch with an upstream tag because the upstream owner has accepted the patch in his GIT tree. However, if the patch has different code with all of the patches stored in the upstream GIT tree, non-upstream code identification module 108 may tag the patch with a non-upstream tag.

Figure 3:
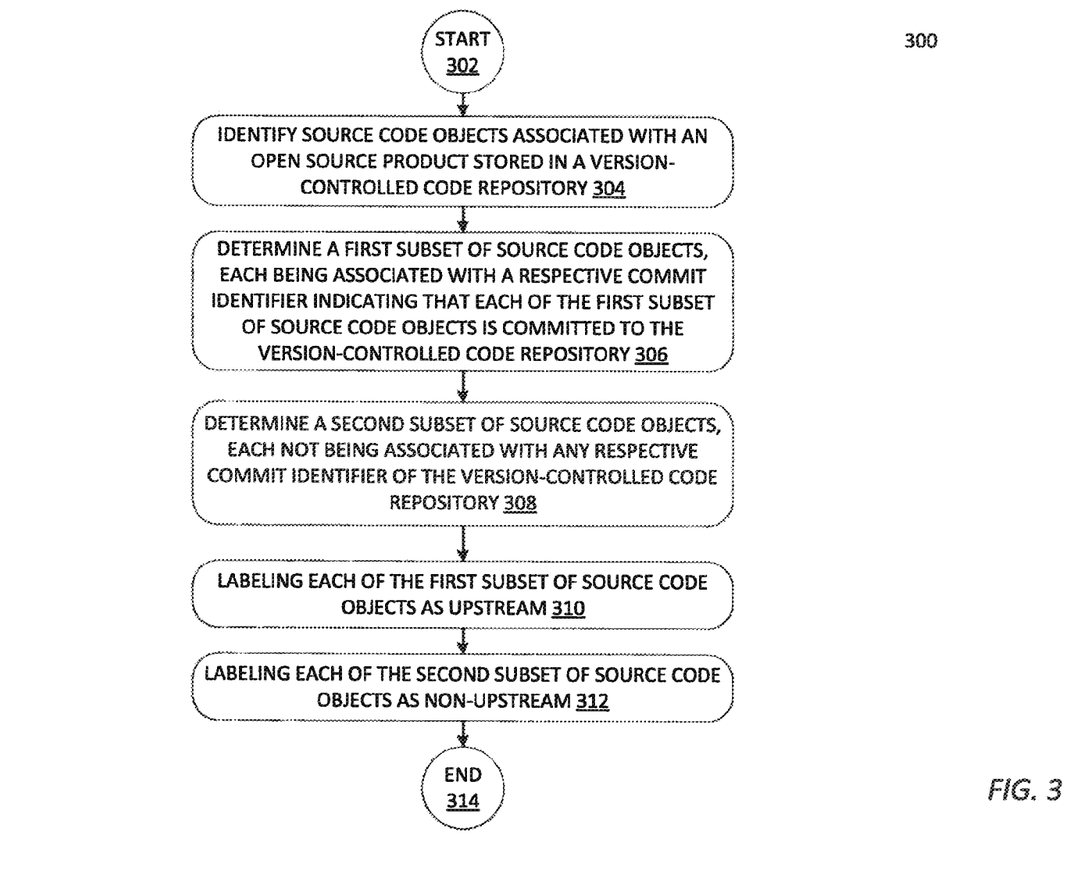
FIG. 3 a flow diagram illustrating a method to identify and label non-upstream software code objects according to some implementations of the disclosure.

FIG. 3 is a flow diagram illustrating a method 300 to determine non-upstream patches in open source product development according to some implementations of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media. In one implementation, the methods may be performed by the processing device 102 executing the non-upstream code identification application 108 as shown in FIG. 1.

Referring to FIG. 3, at 302, the processing logic starts the operations to label non-upstream patches of an open source product. As discussed above, patches may be submitted by open source developers to enhance certain functionalities and fix bugs of software modules of the open source product. In one implementation, the administrator of the open source product may create an open source code repository (e.g., a code depot) to store software modules and all patches that have been reviewed and approved. These software modules and patches may be stored in the form of source code data objects in the code depot. In one implementation, the software modules are already stored in a version-controlled code repository (e.g., a GIT repository).

At 304, the processing logic may identify the patches that have been reviewed and approved to be part of the open source product stored in the version-controlled code repository. These patches may have been submitted by developers to enhance certain functionalities or fix bugs of the open source product. Patches stored in the code depot are not labeled with upstream or non-upstream status.

At 306, the processing logic may check all the patches associated with the open source product to determine a first set of patches each being associated with a respective commit ID of the version-controlled code repository. The commit ID indicates that the patch had been committed to the version-controlled code repository as a commit object. In one implementation, the commit ID is a SHA-1 hash that has a pre-determined length (e.g., 40 bytes).

At 308, the processing logic may further determine a second set of patches associated with the open source product each not being associated with any commit ID of the version-controlled code repository. Patches not being associated with a commit ID are those that have been refused by upstream developers of the open source product.

At 310, the processing logic may label each of the first set of patches as upstream, and at 312, label each of the second set of patches as non-upstream. When the development of the current version of the open source product is completed and the product is released to users as the current version, the processing logic may identifies all patches that are labeled as non-upstream and move the non-upstream patches to a new code depot created for the development of a next version of the open source product. In one implementation, the processing logic may perform the labeling process just prior to the release of the open source product to users as a product.

Figure 4:
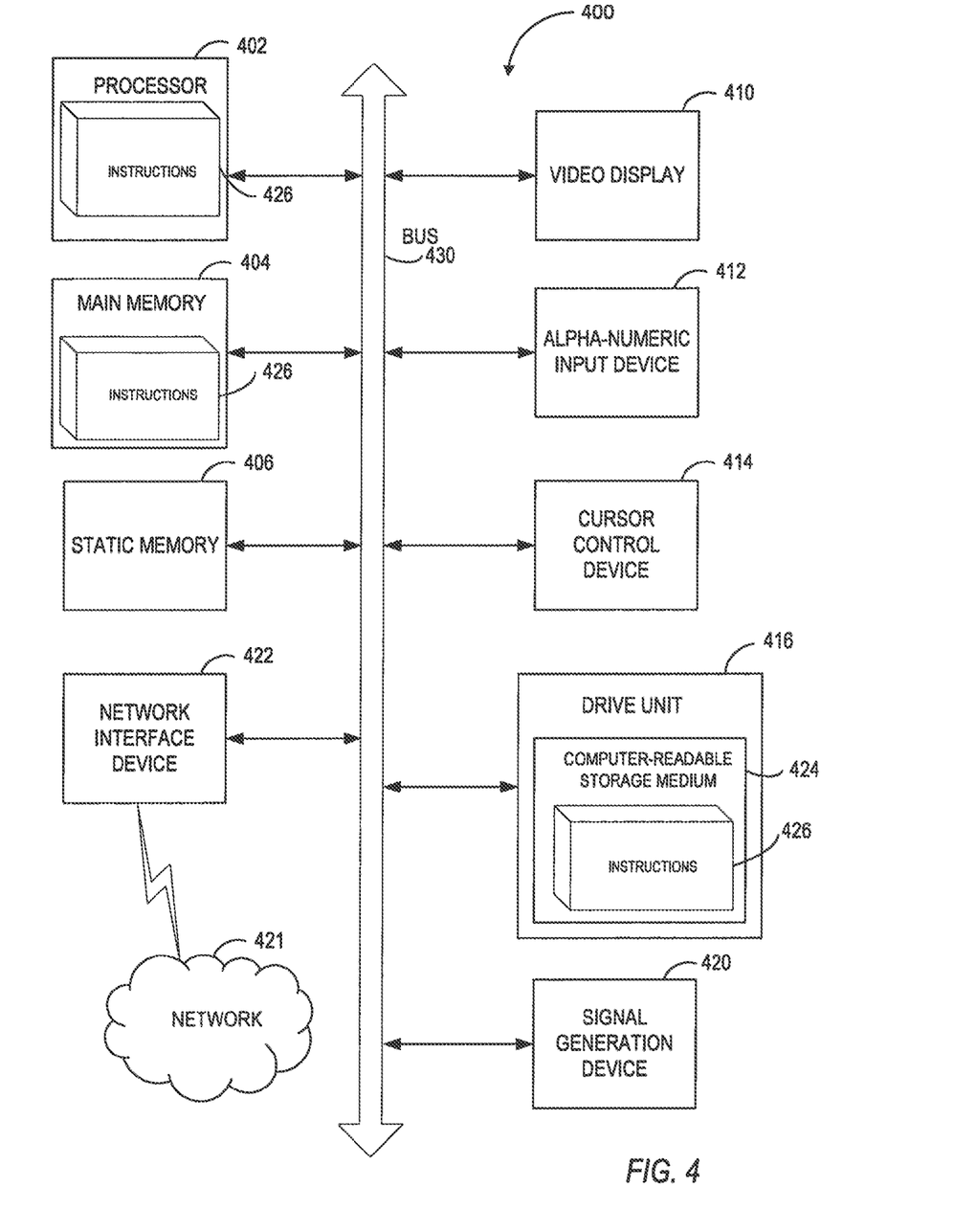
FIG. 4 is a block diagram illustrating an exemplary computer system according to an implementation of the disclosure.

FIG. 4 illustrates a diagrammatic representation of a machine in the exemplary form of a computer system 400 within which a set of instructions for causing the machine to perform any one or more of the methodologies discussed herein may be executed. In alternative implementations, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 422. The computer system 400 also may include a video display unit 410 (e.g., a liquid crystal display (LCD), a cathode ray tube (CRT), or a touch screen), an alphanumeric input device 412 (e.g., a keyboard), a cursor control device 414 (e.g., a mouse), and a signal generation device 420 (e.g., a speaker).

The data storage device 418 may include a computer-readable storage medium 424 on which is stored one or more sets of instructions 426 (e.g., software) embodying any one or more of the methodologies or functions described herein (e.g., the non-upstream code identification module 108). The instructions 426 may also reside, completely or at least partially, within the main memory 404 and/or within the processor 402 during execution thereof by the computer system 400, the main memory 404 and the processor 402 also constituting computer-readable storage media. The instructions 426 may further be transmitted or received over a network 474 via the network interface device 422.

While the computer-readable storage medium 424 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   identifying a plurality of source code objects associated with an open source product stored in a version-controlled code repository;
   determining a first subset of the plurality of source code objects associated with a respective commit identifier indicating that each of the first subset of the plurality of source code objects is committed to the version-controlled code repository;
   labeling each of the first subset of the plurality of source code objects as an upstream source code object using a first identifier indicating an upstream status;
   determining a second subset of the plurality of source code objects without an association with any commit identifier of the version-controlled code repository;
   labeling each of the second subset of the plurality of source code objects as a non-upstream source code object using a second identifier indicating a non-upstream status; and
   transferring, by a processing device, the each of the second subset identified by the second identifier to a code depot designated to store a next version of the open source product.

2. The method of claim 1, further comprising:
   releasing the open source product as a first version.

3. The method of claim 1, wherein the version-controlled code repository comprises a GIT repository, and wherein the commit identifier comprises a GIT commit ID.

4. The method of claim 1, wherein at least one of the plurality of source code objects comprises a patch contributed by a second developer to cure a defect in a first source code object contributed by a first developer.

5. The method of claim 4, further comprising:
   in response to receiving an approval by the first developer of the at least one of the plurality of source code objects to be committed to the version-controlled code repository, committing the at least one of the plurality of source code objects to the version-controlled code repository.

6. The method of claim 4, wherein the patch modifies a software module of the open source product to produce a modified version of the software module.

7. The method of claim 6, wherein the version-controlled code repository comprises a history tree of the software module, and wherein the history tree comprises the software module and the modified version of the software module committed to the version-controlled code repository.

8. A non-transitory machine-readable storage medium storing instructions which, when executed, cause a processing device to:
   identify a plurality of source code objects associated with an open source product stored in a version-controlled code repository;
   determine a first subset of the pluraiity of source code objects associated with a respective commit identifier indicating that each of the first subset of the plurality of source code objects is committed to the version-controlled code repository;
   label each of the first subset of the piurality of source code objects as an upstream source code object using a first identifier indicating an upstream status;
   determine a second subset of the plurality of source code objects without an association with any commit identifier of the version-controlled code repository;
   label each of the second subset of the plurality of source code objects as a non-upstream source code object using a second identifier indicating a non-upstream status; and
   transfer, by the processing device, the each of the second subset identified by the second identifier to a code depot designated to store a next version of the open source product.

9. The non-transitory machine-readable storage medium of claim 8, wherein the processing device is further to:
   release the open source product as a first version.

10. The non-transitory machine-readable storage medium of claim 8, wherein the version-controlled code repository comprises a GIT repository, and wherein the commit identifier comprises a GIT commit ID.

11. The non-transitory machine-readable storage medium of claim 8, wherein at least one of the plurality of source code objects comprises a patch contributed by a second developer to cure a defect in a first source code object contributed by a first developer.

12. The non-transitory machine-readable storage medium of claim 11, wherein the processing device is further to, in response to receiving an approval by the first developer of the at least one of the plurality of source code objects to be committed to the version-controlled code repository, commit the at least one of the plurality of source code objects to the version-controlled code repository.

13. The non-transitory machine-readable storage medium of claim 11, wherein the patch modifies a software module of the open source product to produce a modified version of the software module.

14. The non-transitory machine-readable storage medium of claim 13, wherein the version-controlled code repository comprises a history tree of the software module, and wherein the history tree comprises the software module and the modified version of the software module committed to the version-controlled code repository.

15. A system, comprising:
a memory; and
a processing device, operatively coupled to the memory, the processing device to:
identify a plurality of source code objects associated with an open source product stored in a version-controlled code repository;
determine a first subset of the plurality of source code objects associated with a respective commit identifier indicating that each of the first subset of the plurality of source code objects is committed to the version-controlled code repository;
label each of the first subset of the plurality of source code objects as an upstream source code object using a first identifier indicating an upstream status;
determine a second subset of the plurality of source code objects without an association with any commit identifier of the version-controlled code repository;
label each of the second subset of the plurality of source code objects as a non-upstream source code object using a second identifier indicating a non-upstream status; and
transfer the each of the second subset identified by the second identifier to a code depot designated to store a next version of the open source product.

16. The system of claim 15, wherein the processing device is further to:
release the open source product as a first version.

17. The system of claim 15, wherein the version-controlled code repository comprises a GIT repository, and wherein the commit identifier comprises a GIT commit ID.

18. The system of claim 15, wherein at least one of the plurality of source code objects comprises a patch contributed by a second developer to cure a defect in a first source code object contributed by a first developer.

19. The system of claim 18, wherein the processing device is further to, in response to receiving an approval by the first developer of the at least one of the plurality of source code objects to be committed to the version-controlled code repository, commit the at least one of the plurality of source code objects to the version-controlled code repository.

20. The system of claim 18, wherein the patch modifies a software module of the open source product to produce a modified version of the software module, and wherein the version-controlled code repository comprises a history tree of the software module, the history tree comprising the software module and the modified version of the software module committed to the version-controlled code repository.

* * * * *